US012620653B2

(12) United States Patent
Shimizu et al.

(10) Patent No.: US 12,620,653 B2
(45) Date of Patent: May 5, 2026

(54) BATTERY AND METHOD FOR PRODUCING SAME

(71) Applicant: Panasonic Intellectual Property Management Co., Ltd., Osaka (JP)

(72) Inventors: Kazumichi Shimizu, Osaka (JP); Koji Funami, Kyoto (JP); Hiroshi Takasaki, Osaka (JP)

(73) Assignee: Panasonic intellectual Property Management Co., Ltd., Osaka (JP)

( * ) Notice: Subject to any disclaimer, the term of this patent is extended or adjusted under 35 U.S.C. 154(b) by 926 days.

(21) Appl. No.: 17/419,181

(22) PCT Filed: Dec. 27, 2019

(86) PCT No.: PCT/JP2019/051607
§ 371 (c)(1),
(2) Date: Jun. 28, 2021

(87) PCT Pub. No.: WO2020/138492
PCT Pub. Date: Jul. 2, 2020

(65) Prior Publication Data
US 2022/0102789 A1 Mar. 31, 2022

(30) Foreign Application Priority Data
Dec. 28, 2018 (JP) ................................. 2018-248605
Dec. 28, 2018 (JP) ................................. 2018-248606

(51) Int. Cl.
*H01M 50/107* (2021.01)
*H01M 50/147* (2021.01)
(Continued)

(52) U.S. Cl.
CPC ....... *H01M 50/107* (2021.01); *H01M 50/147* (2021.01); *H01M 50/188* (2021.01); *H01M 50/559* (2021.01)

(58) Field of Classification Search
CPC ............. H01M 50/107; H01M 50/147; H01M 50/188; H01M 50/559; H01M 50/152;
(Continued)

(56) References Cited

U.S. PATENT DOCUMENTS 5,377,861 A   1/1995   Landis
6,399,237 B1  6/2002   Souliac et al.
(Continued)

FOREIGN PATENT DOCUMENTS

CN     103370815 A    10/2013
CN     207818650 U     9/2018
(Continued)

OTHER PUBLICATIONS

Chinese Office Action issued in corresponding Chinese Patent Application No. 201980086133.6, issued on Oct. 24, 2022, with English translation.
(Continued)

*Primary Examiner* — Matthew T Martin
*Assistant Examiner* — Bartholomew A Hornsby
(74) *Attorney, Agent, or Firm* — Rimon P.C.

(57) ABSTRACT

Disclosed is a battery including: a battery can including a cylinder portion including an opening edge portion at one end portion thereof and a bottom portion closing the other end portion of the cylinder portion; an electrode body housed in the cylinder portion; and a sealing member fixed to the cylinder portion to seal an opening of an opening edge portion. The sealing member includes a lid portion covering the opening of the opening edge portion. A first engagement portion is formed in the end portion of the cylinder portion on the opening edge portion side, and a second engagement portion is formed in an end portion of the lid portion on an outer circumferential side. A first surface of the first engagement portion and a second surface of the second engagement
(Continued)

portion are bonded, with the first surface and the second surface overlapping each other.

4 Claims, 7 Drawing Sheets

(51) Int. Cl.
    *H01M 50/188*     (2021.01)
    *H01M 50/559*     (2021.01)

(58) Field of Classification Search
    CPC ............. H01M 50/169; H01M 50/184; H01M 50/102; H01M 50/148; Y02E 60/10
    See application file for complete search history.

(56)            References Cited

U.S. PATENT DOCUMENTS

| | | | |
|---|---|---|---|
| 6,562,508 B1 * | 5/2003 | Satoh | H01M 50/147 |
| | | | 429/57 |
| 2005/0153194 A1 * | 7/2005 | Kimura | H01M 50/627 |
| | | | 429/174 |
| 2006/0222940 A1 * | 10/2006 | Fujikawa | H01M 10/0587 |
| | | | 429/174 |
| 2007/0257044 A1 | 11/2007 | Stevens | |
| 2008/0131768 A1 * | 6/2008 | Lee | H01M 50/171 |
| | | | 429/174 |
| 2010/0258538 A1 | 10/2010 | Suzuki et al. | |
| 2010/0266893 A1 * | 10/2010 | Martin | H01M 50/147 |
| | | | 29/730 |
| 2013/0234721 A1 * | 9/2013 | Nakamura | H01M 10/425 |
| | | | 324/426 |

| | | | |
|---|---|---|---|
| 2013/0316209 A1 | 11/2013 | Masumoto et al. | |
| 2015/0165817 A1 | 6/2015 | Alvares et al. | |
| 2019/0237712 A1 | 8/2019 | Zhang et al. | |

FOREIGN PATENT DOCUMENTS

| | | | |
|---|---|---|---|
| DE | 102015218530 A1 | | 3/2017 |
| JP | S48-38327 U | | 5/1973 |
| JP | 51003369 Y | * | 1/1976 |
| JP | S51-3369 Y1 | | 1/1976 |
| JP | 51003369 | * | 5/1976 |
| JP | H7-105933 A | | 4/1995 |
| JP | 2000-182576 A | | 6/2000 |
| JP | 2001-52759 A | | 2/2001 |
| JP | 2001-110372 A | | 4/2001 |
| JP | 2004195490 A | * | 7/2004 |
| JP | 2009-140753 A | | 6/2009 |
| JP | 2009-146645 A | | 7/2009 |
| JP | 2010-027436 A | | 2/2010 |
| JP | 2014-035871 A | | 2/2014 |
| JP | 2015-060827 A | | 3/2015 |
| JP | 2015-109140 A | | 6/2015 |

OTHER PUBLICATIONS

Chinese Rejection Decision with its English partial translation dated on Apr. 27, 2024, issued in the corresponding Chinese Patent Application No. 201980086133.6.

International Search Report issued in corresponding International Patent Application No. PCT/JP2019/051607, dated Mar. 31, 2020, with partial English translation.

Chinese Office Action dated Nov. 20, 2023 issued in the corresponding Chinese Patent Application No. 201980086133.6 w/English Translation of Search Report.

* cited by examiner

BATTERY AND METHOD FOR PRODUCING SAME

CROSS-REFERENCE OF RELATED APPLICATIONS

This application is the U.S. National Phase under 35 U.S.C. § 371 of International Patent Application No. PCT/JP2019/051607, filed on Dec. 27, 2019, which in turn claims the benefit of Japanese Application Nos. 2018-248606 and 2018-248605, both filed on Dec. 28, 2018, the entire disclosures of which Applications are incorporated by reference herein.

TECHNICAL FIELD

The present invention relates to a battery and a method for producing the same.

BACKGROUND ART

As a method for sealing an opening of a battery can after an electrode body is housed into the battery can, a method as disclosed in Patent Literature 1 is known in which an annular groove is formed by recessing the vicinity of the opening of the battery case (battery can) inward, thereafter, a gasket and a sealing plate are placed on an upper portion of the groove portion, and a crimp portion is formed by crimping an opening end portion of the battery case onto the sealing plate with the gasket interposed therebetween.

CITATION LIST

Patent Literature

[PTL 1] Laid-Open Patent Publication No. H7-105933

SUMMARY OF INVENTION

Technical Problem

However, in the battery that includes the groove portion and the crimp portion, a sealing member is placed on the groove portion, and the crimp portion is formed on the sealing member with the gasket interposed therebetween, and thus the dimension in the height direction of the battery tends to be large in the vicinity of the sealing plate. Accordingly, there is a limitation on increasing the energy density of the battery.

Solution to Problem

An aspect of the present invention relates to a battery including: a battery can that includes a cylinder portion and a bottom portion, the cylinder portion having an opening edge portion at one of end portions of the cylinder portion, the other one of the end portions of the cylinder portion being closed by bottom portion; an electrode body that is housed in the cylinder portion; and a sealing member that is fixed to the cylinder portion to seal an opening of the opening edge portion, wherein the sealing member includes a lid portion that covers the opening, a first engagement portion is formed in the end portion of the cylinder portion on an opening edge portion side, a second engagement portion is formed in an end portion of the lid portion on an outer circumferential side, and a first surface of the first engagement portion and a second surface of the second engagement portion are bonded to each other, with the first surface and the second surface overlapping each other.

Another aspect of the present invention relates to a method for producing a battery, the method including: a step of preparing a battery can that includes a cylinder portion and a bottom portion, the cylinder portion having an opening edge portion at one of end portions of the cylinder portion, the other one of the end portions of the cylinder portion being closed by the bottom portion; a step of preparing a sealing member that includes a lid portion that covers an opening of the opening edge portion; and a welding step of welding the sealing member to the battery can, wherein the battery can includes, in the opening edge portion, a first surface that is inclined obliquely with respect to a radial direction of the cylinder portion and is formed by the opening edge portion being bent, the lid portion includes, in an end portion of the lid portion on an outer circumferential side, a second surface that is inclined obliquely with respect to an axial direction of the cylinder portion, and the welding step is a step of placing the sealing member on the battery can in which an electrode body is housed so as to close the opening edge portion, pressing the first surface of the cylinder portion against the second surface of the lid portion such that they overlap each other, and bonding the first surface of the cylinder portion and the second surface of the lid portion to each other by welding.

Advantageous Effects of Invention

According to the present invention, it is possible to easily achieve a battery with a high energy density.

Novel features of the present invention are set forth in the appended claims. However, the configuration and details of the present invention, as well as other objects and features of the present invention, will be further understood with reference to the following detailed description and the accompanying drawings.

DESCRIPTION OF EMBODIMENTS

Figure 1A:
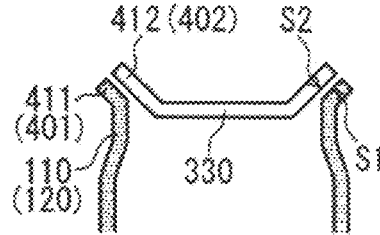
FIG. 1A is a schematic diagram showing an example of a method for bonding a lid portion and an opening edge portion in a battery according to an embodiment of the present invention.

A battery according to an embodiment of the present invention includes: a battery can that includes a cylinder portion and a bottom portion having an opening edge portion at one of end portions of the cylinder portion, the other one of the end portions of the cylinder portion is closed by the bottom portion; an electrode body that is housed in the cylinder portion; and a sealing member that is fixed to the cylinder portion to seal an opening of the opening edge portion. The sealing member includes a lid portion that covers the opening.

Here, a direction in which the two end portions of the cylinder portion face each other is defined as the axial direction. Also, for the sake of convenience, a direction from the opening edge portion toward the bottom portion is defined as the downward direction, and a direction from the bottom portion toward the opening edge portion is defined as the upward direction. That is, the upward direction and the downward direction of the battery is defined based on the orientation of the axial direction of the cylinder portion when the battery can is placed vertically with the bottom portion facing downward. A direction perpendicular to the axial direction may also be referred to as "horizontal direction" or "radial direction".

A first engagement portion is formed in the end portion of the cylinder portion on an opening edge portion side. On the other hand, a second engagement portion is formed in an end portion of the lid portion on an outer circumferential side. A first surface of the first engagement portion and a second surface of the second engagement portion are bonded to each other, with the first surface and the second surface overlapping each other.

The first surface and the second surface can be bonded by, for example, welding. By performing welding, the battery can is hermetically sealed, and the lid portion can be firmly fixed to the battery can. In this case, it is unnecessary to form a conventional annular groove (also referred to as "radially recessed portion") and a crimp portion at the opening edge portion, and thus the distance between the electrode body and the sealing member can be shortened. For example, the electrode body can be disposed at a position in more proximity to the terminal portion, or the height of the electrode body can be increased to a position in proximity to the terminal portion. Accordingly, the energy density of the battery can be increased.

However, in the case where the opening edge portion is sealed by welding, elimination of a gap between the opening edge portion and the end portion of the lid portion on the outer circumferential side is required to prevent a welding failure. For this reason, to seal the battery can, the opening edge portion and the end portion of the lid portion on the outer circumferential side are required to be processed into substantially the same shape in the circumferential direction, which requires a high level of processing accuracy.

In contrast, in the battery of the embodiment of the present invention, the first surface of the first engagement portion and the second surface of the second engagement portion are brought together to overlap each other, and then bonded by welding. In other words, the first surface and the second surface are welded in surface contact with each other. By doing so, a gap is unlikely to be formed between the opening edge portion and the end portion of the lid portion on the outer circumferential side, and the bonding strength can be increased. For example, by pressing the second engagement portion against the first engagement portion, the gap in the circumferential direction is reduced, and the first surface and the second surface can be brought into surface contact with each other.

As an aspect of the first engagement portion, the opening edge portion may include a first portion that is bent and extend outward or inward of the cylinder portion in the radial direction. In this case, the first portion can form the first engagement portion.

As used herein, the expression "a portion is bent and extends" encompasses not only the case where the portion is bent and extends, but also the case where an extension portion from a bent has a curved shape, and the extension direction continuously changes (or in other words, the case where the portion is curved and extends). The same applies to second to fourth portions, which will be described later.

Here, a direction that is the axial direction of the cylinder portion and extends from the bottom portion toward the opening edge portion is defined as the Z direction. Also, a direction (the radial direction) that is perpendicular to the axial direction and extends from the axis of the cylinder portion toward the outer circumference is defined as the r direction.

The expression "the first portion of the opening edge portion is bent and extends outward or inward of the cylinder portion in the radial direction" means that, when V0 denotes a unit vector that represents an extension direction of a predetermined portion of the cylinder portion (for example, the axial direction of the cylinder portion), and V1 denotes a unit vector that represents an extension direction of the first portion that is bent and extends from the predetermined portion, a component of V1 in the r direction changes from a component of V0 in the r direction. In this case, when the component of V1 in the r direction decreases from the component of V0 in the r direction, the opening edge portion is bent inward in the radial direction. When the component of V1 in the r direction increases from the component of V0 in the r direction, the opening edge portion is bent outward in the radial direction. In other words, the expression "the opening edge portion is bent and extends" means that the opening edge portion extends so as to be spaced apart in the radial direction from an imaginary straight line that extends in the axial direction of the cylinder portion.

Also, as an aspect of the second engagement portion, the end portion of the lid portion on the outer circumferential side may include a second portion that is bent and extends toward the bottom portion side or the opening edge portion side in the axial direction. In this case, the second portion can form the second engagement portion.

Here, the expression "the second portion of the lid portion is bent and extends toward the bottom portion side or the opening edge portion side in the axial direction" means that, when W0 denotes a unit vector that represents an extension direction of a predetermined portion of the lid portion (for example, a direction perpendicular to the axis of the cylinder portion), and W1 denotes a unit vector that represents an extension direction of the second portion that is bent and extends from the predetermined portion, a component of W1 in the Z direction changes from a component of W0 in the Z direction. In this case, when the component of W1 in the Z direction decreases from the component of W0 in the Z direction, the end portion of the lid portion on the outer circumferential side is bent toward the bottom portion side. When the component of W1 in the Z direction increases from the component of W0 in the Z direction, the end portion of the lid portion on the outer circumferential side is bent toward the opening edge portion side. The same applies to a third portion and a fourth portion, which will be described later. In other words, the expression "the lid portion is bent and extends" means that the lid portion extends so as to be spaced apart in the axial direction from an imaginary straight line that extends in a direction perpendicular to the axis of the cylinder portion.

Because the cylinder portion (opening edge portion) includes an extension portion (first portion) that is bent, the cylinder portion is likely to deflect (like a spring) in response to a force in the axial direction. For this reason, even when there is a slight gap partially between the first engagement portion and the second engagement portion in the circumferential direction while the first engagement portion and the second engagement portion are in a non-pressed state, the cylinder portion and the end portion of the lid portion on the outer circumferential side properly deform by being pressed, and thus the first engagement portion and the second engagement portion can be brought into contact with each other while the gap between the first surface and the second surface is reduced. Accordingly, by welding the opening edge portion and the end portion of the lid portion on the outer circumferential side to each other in this state, welding failures can be reduced. The second portion may be provided in the lid portion correspondingly to the first portion such that the first surface and the second overlap each other.

The end portion of the lid portion on the outer circumferential side may include a third portion that is bent and extends toward the bottom portion side or the opening edge side in the axial direction of the cylinder portion, and a fourth portion that is bent and extends from the third portion in a direction opposite to the bending direction of the third portion. In this case, the fourth portion can form the second engagement portion. The expression "the fourth portion is bent and extends in a direction opposite to the bending direction of the third portion" means that, in the case where the third portion is bent and extends toward the bottom portion side, the fourth portion is bent and extends toward the opening portion side, or in the case where the third portion is bent and extends toward the opening edge portion side, the fourth portion is bent and extends toward the bottom portion side. Accordingly, the lid portion that includes the third portion and the fourth portion extends, in the outer circumferential direction, while being bent in a zigzag pattern. The lid portion may extend, in the outer circumferential direction, while being bent in a zigzag pattern or while being bent in a crank shape.

In the lid portion that includes at least the third portion, the third portion may form the second engagement portion. In other words, the lid portion that includes the second portion described above may be further bent on the end portion side of the second portion, and extends in a direction different from the bending direction of the second portion.

The third portion may extend along an inner circumferential surface of the cylinder portion. With this configuration, misalignment of the lid portion in the radial direction is suppressed, and variation in the cross-sectional shape of the bonding portion between the lid portion and the cylinder portion can be minimized Accordingly, non-uniformity of bonding strength can be suppressed.

Also, the lid portion may include, instead of the third portion, a rib that stands from a surface of the lid portion that opposes the electrode body and extends along the inner circumferential surface of the cylinder portion. With the rib, it is possible to obtain advantageous effects that are the same as those obtained as a result of the third portion extending along the inner circumferential surface of the cylinder portion.

The first surface of the first engagement portion and the second surface of the second engagement portion may be inclined obliquely with respect to the radial direction and the axial direction. The inclined first surface may be an outer circumferential surface, an inner circumferential surface, or an end face of the cylinder portion. The inclined second surface may be a surface of the lid portion on the bottom portion side (the inner surface or the lower surface), a surface of the lid portion on the opening edge portion side (the outer surface), or an end face of the lid portion. In the case where the first surface is the end face of the cylinder portion, the second surface may be the surface of the lid portion on the bottom portion side. In the case where the second surface is the end face of the lid portion, the first surface may be the inner circumferential surface of the cylinder portion.

The end face of the cylinder portion may be inclined from a plane perpendicular to the extension direction of the opening edge portion, and the inclined surface may form the first surface. Alternatively, an end face of the lid portion on the outer circumferential side may be inclined from a plane perpendicular to the extension direction of the end portion of the lid portion on the outer circumferential side, and the inclined surface may form the second surface. In other words, the end face of the cylinder portion and/or the end face of the lid portion on the outer circumferential side may be an end face of a metal plate obtained by obliquely cutting the metal plate and/or processing the metal plate such that an obliquely cut face is formed.

The welding method is not particularly limited, and can be selected as appropriate according to the material of the lid portion and the battery can. Examples of the welding method include laser welding, resistance welding, friction stir welding, braze welding, and the like.

In either one of the first surface and the second surface may include a region that does not overlap the other one of the first surface and the second surface and is exposed to the outside. With this configuration, laser welding by heat conduction can be easily performed.

The sealing member includes a terminal portion. The terminal portion may be electrically connected to one (first electrode) of electrodes included in the electrode body. Also, the battery can may be electrically connected to the other electrode (second electrode) of the electrode body. For example, the lid portion is made of a metal, and includes a through hole. In this case, the terminal portion closes the through hole while being insulated from the lid portion. Insulation and sealing between the terminal portion and the lid portion may be implemented by providing a gasket therebetween, by applying an insulating material to an abutting portion where the terminal portion and the lid portion abut against each other, or by subjecting a surface of one of the terminal portion and the lid portion to insulation processing.

The lid portion is electrically connected to the cylinder portion of the battery can via an alloy portion. With this configuration, the lid portion can be electrically connected to the second electrode of the electrode body. Accordingly, the voltage of an external terminal connected to the battery can can be taken out from the upper side (terminal portion side) of the battery, in particular, from the top plate portion of the lid portion.

In an ordinary battery, the terminal portion functions as an external terminal for a first electrode (for example, positive electrode) of the battery, and the battery can functions as an external terminal for a second electrode (for example, negative electrode). In the case where an external lead wire is connected to each external terminal, one of the external lead wires is drawn out from the upper surface of the battery, and the other external lead wire is drawn out from the lower surface of the battery. In this case, it is necessary to provide wiring spaces in the up and down directions of the battery.

In contrast, in the battery of the embodiment of the present invention, the lid portion can functions as the external terminal for the second electrode connected to the battery can. For this reason, electric current from each of the first electrode and the second electrode can be collected from the upper side (terminal portion side) of the battery. Accordingly, it is sufficient to provide a space (wiring space) for lead wires connected to the external terminals only on the terminal portion side, and thus the wiring space can be saved.

A method for producing a battery according to an embodiment of the present invention includes: for example, a step (i) of preparing a battery can that includes a cylinder portion and a bottom portion, the cylinder portion having an opening edge portion at one of end portions of the cylinder portion and the other one of the end portions of the cylinder portion being closed by the bottom portion; a step (ii) of preparing a sealing member that includes a lid portion that covers an opening of the opening edge portion; and a welding step (iii) of welding the sealing member to the battery can. At this time, the battery can prepared in the step (i) includes, in the opening edge portion, a first surface that is inclined obliquely with respect to a radial direction of the cylinder portion and is formed by the opening edge portion being bent. The lid portion prepared in the step (ii) includes, in an end portion of the lid portion on an outer circumferential side, a second surface that is inclined obliquely with respect to an axial direction of the cylinder portion. The welding step (iii) may be a step of placing the sealing member on the battery can in which an electrode body is housed so as to close the opening edge portion, pressing the first surface of the cylinder portion against the second surface of the lid portion such that they overlap each other, and bonding the first surface of the cylinder portion and the second surface of the lid portion to each other by welding.

Hereinafter, batteries according to embodiments of the present invention will be described specifically with reference to the drawings. However, the present invention is not limited thereto.

First Embodiment

FIGS. 1 to 3 are schematic diagrams showing examples of a method for bonding a lid portion 330 to an opening edge portion 110 of a cylinder portion 120 of a battery according to the present embodiment by welding. FIG. 1 (FIGS. 1A to 1F) show examples in which an end portion of the opening edge portion 110 is bent outward in the radial direction. FIG. 2 (FIGS. 2A to 2F) show examples in which the end portion of the opening edge portion 110 is bent inward in the radial direction. FIG. 3 (FIGS. 3A to 3H) show examples in which the opening edge portion 110 has a straight shape that does not include a bent portion.

In the examples shown in FIGS. 1 to 3, the end portion of the opening edge portion 110 includes a first engagement portion 401. An end portion of the lid portion 330 on the outer circumferential side includes a second engagement portion 402. The first engagement portion 401 includes a first surface S1, and the second engagement portion 402 includes a second surface S2. The first surface S1 and the second surface S2 are in surface contact with each other as a result of the lid portion 330 being pressed against the cylinder portion 120 during welding.

In FIGS. 1A to 1F, the opening edge portion 110 includes, at the end portion thereof, a first portion 411 that is bent and extends outward in the radial direction. The first portion 411 forms the first engagement portion 401. In FIGS. 1A to 1F, the first surface S1 is a portion of the inner circumferential surface of the cylinder portion, and is inclined obliquely with respect to the axial direction and the radial direction. The second surface S2 is also inclined obliquely with respect to the axial direction and the radial direction so as to correspond to the first surface S1.

In FIGS. 1A, 1B, 1D, and 1E, the second surface S2 is a portion of the surface (lower surface) of the lid portion on the bottom portion side. In FIG. 1C, the second surface S2 is an end face of the lid portion, and the end face of the lid portion is inclined from a plane perpendicular to the extension direction (the radial direction) of the end portion of the lid portion on the outer circumferential side. Accordingly, the second surface S2 is inclined obliquely with respect to the axial direction and the radial direction. In FIG. 1F, the second surface S2 is a portion of the outer surface (upper surface) of the lid portion that is bent.

Figure 1B:
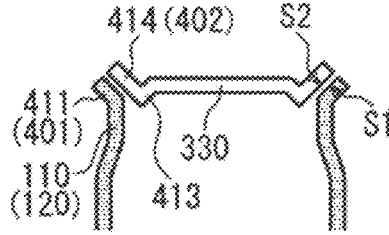
FIG. 1B is a schematic diagram showing an example of the method for bonding the lid portion and the opening edge portion in the battery according to the embodiment of the present invention.
Figure 1C:
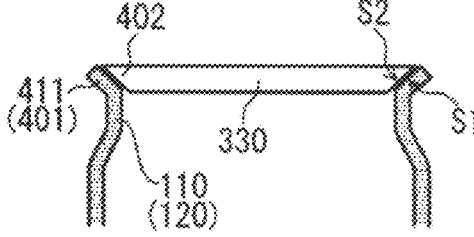
FIG. 1C is a schematic diagram showing an example of the method for bonding the lid portion and the opening edge portion in the battery according to the embodiment of the present invention.
Figure 1D:
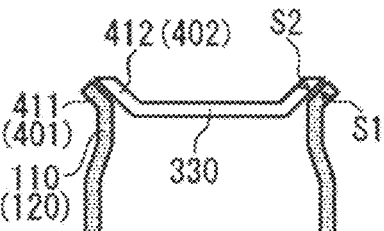
FIG. 1D is a schematic diagram showing an example of the method for bonding the lid portion and the opening edge portion in the battery according to the embodiment of the present invention.
Figure 1E:
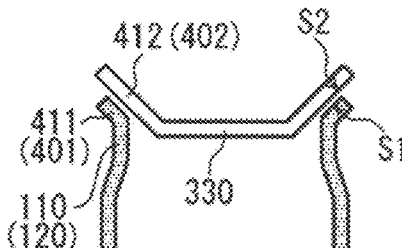
FIG. 1E is a schematic diagram showing an example of the method for bonding the lid portion and the opening edge portion in the battery according to the embodiment of the present invention.
Figure 1F:
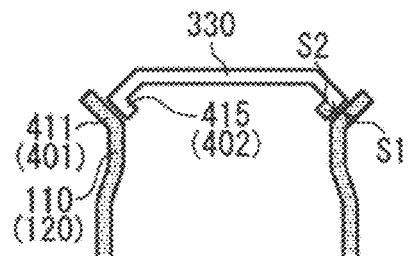
FIG. 1F is a schematic diagram showing an example of the method for bonding the lid portion and the opening edge portion in the battery according to the embodiment of the present invention.

In FIGS. 1A, 1D, and 1E, the end portion of the lid portion 330 on the outer circumferential side includes a second portion 412 that is bent and extends toward the opening edge portion side in the axial direction of the cylinder portion. The second portion 412 forms the second engagement portion 402.

In FIG. 1B, the end portion of the lid portion 330 on the outer circumferential side includes a third portion 413 that is bent and extends toward the bottom portion side in the axial direction of the cylinder portion and a fourth portion 414 that is bent and extends from the third portion 413 in a direction opposite to the bending direction of the third portion. In other words, the end portion of the lid portion 330 is bent backward on the lower surface side of the lid portion 330, and the fourth portion 414 is thereby formed. The fourth portion 414 forms the second engagement portion 402. With the configuration shown in FIG. 1B, the internal space of the battery can 100 can be increased.

In FIG. 1F, the end portion of the lid portion 330 on the outer circumferential side is bent toward the bottom portion side in the axial direction of the cylinder portion, and then further bent inward in the radial direction. The end portion of the lid portion 330 includes a fifth portion 415 that is bent, and the outer surface of the fifth portion 415 comes into contact with the first surface S1 that is a portion of the inner circumferential surface of the opening edge portion 110. In other words, the fifth portion 415 forms the second engagement portion 402.

In FIG. 1E, a portion of the second surface S2 on the outer circumferential side does not overlap the first surface S1 and is exposed to the outside even when they are welded. On the other hand, in FIG. 1F, a portion of the first surface S1 on the outer circumferential side does not overlap the second surface S2 and is exposed to the outside even when they are welded.

In FIGS. 1A to 1F, the lid portion 330 may be bonded to the opening edge portion 110 of the cylinder portion 120 by welding. As the welding method, laser welding can be used. In the case where laser welding is performed, as shown in the examples shown in FIGS. 1A to 1D, butt welding can be performed by applying a laser beam from an obliquely upward direction. Also, butt welding and overlap welding can be performed by applying a laser beam from an upward direction. In FIG. 1E, for example, butt welding and overlap welding can be performed by applying a laser beam from the horizontal direction. In FIG. 1F, for example, butt welding can be performed by applying a laser beam from an upward direction.

In FIGS. 2A to 2F, the opening edge portion 110 includes, in the end portion thereof, a first portion 411 that is bent inward and extends in the radial direction. The first portion 411 forms the first engagement portion 401. In the examples shown in FIGS. 2A to 2E, the first surface S1 is the end face of the cylinder portion. In the example shown in FIG. 2F, the first surface S1 is an outer circumferential surface of the first portion 411 of the opening edge portion 110. The first surface S1 is inclined obliquely with respect to the axial direction and the radial direction as a result of the end portion of the opening edge portion 110 being bent. The second surface S2 is also inclined obliquely with respect to the axial direction and the radial direction so as to correspond to the first surface S1.

In FIGS. 2A and 2B, and FIGS. 2D to 2F, the second surface S2 is the inner surface (lower surface) of the lid portion on the bottom portion side. In FIG. 2C, the second surface S2 is the end face of the lid portion, and the end face of the lid portion is inclined from a plane perpendicular to the extension direction (the radial direction) of the end portion of the lid portion on the outer circumferential side. Accordingly, the second surface S2 is inclined obliquely with respect to the axial direction and the radial direction.

Figure 2A:
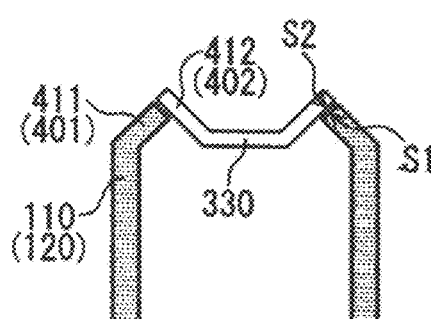
FIG. 2A is a schematic diagram showing another example of the method for bonding the lid portion and the opening edge portion in the battery according to the embodiment of the present invention.
Figure 2B:
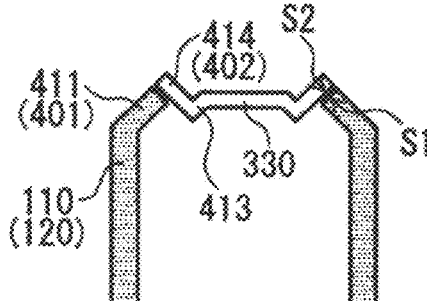
FIG. 2B is a schematic diagram showing another example of the method for bonding the lid portion and the opening edge portion in the battery according to the embodiment of the present invention.
Figure 2C:
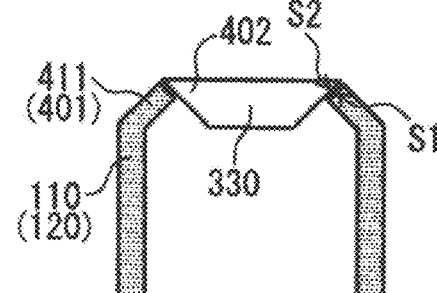
FIG. 2C is a schematic diagram showing another example of the method for bonding the lid portion and the opening edge portion in the battery according to the embodiment of the present invention.
Figure 2D:
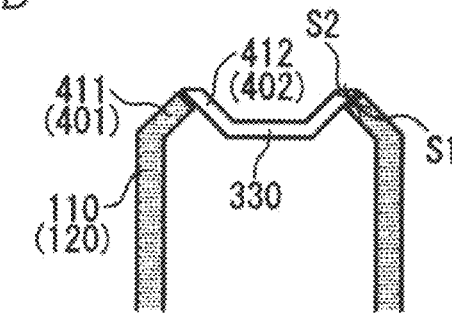
FIG. 2D is a schematic diagram showing another example of the method for bonding the lid portion and the opening edge portion in the battery according to the embodiment of the present invention.
Figure 2E:
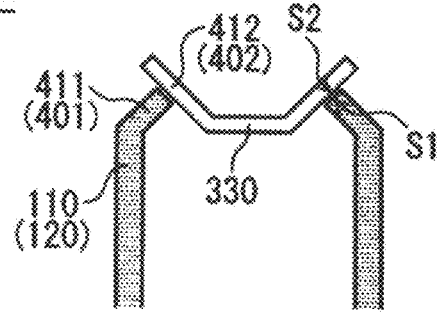
FIG. 2E is a schematic diagram showing another example of the method for bonding the lid portion and the opening edge portion in the battery according to the embodiment of the present invention.

In FIGS. 2A, 2D, and 2E, the end portion of the lid portion 330 includes a second portion 412 that is bent and extends toward the opening edge portion side in the axial direction of the cylinder portion. The second portion 412 forms the second engagement portion 402.

In the example shown in FIG. 2B, the end portion of the lid portion 330 includes a third portion 413 that is bent and extends toward the bottom portion side in the axial direction of the cylinder portion and a fourth portion 414 that is bent and extends from the third portion 413 in a direction opposite to the bending direction of the third portion. The fourth portion 414 forms the second engagement portion 402. With the configuration shown in FIG. 2B, the internal space of the battery can 100 can be increased as compared with the configuration shown in FIG. 2E or the like.

Figure 2F:
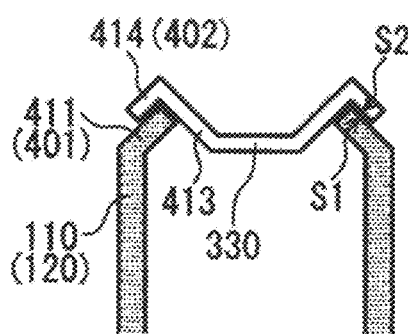
FIG. 2F is a schematic diagram showing another example of the method for bonding the lid portion and the opening edge portion in the battery according to the embodiment of the present invention.

In FIG. 2F, the end portion of the lid portion 330 includes a third portion 413 that is bent and extends toward the opening edge portion side (in the upward direction of the battery) in the axial direction of the cylinder portion and a fourth portion 414 that is bent from the third portion 413 and extends in a direction opposite to the bending direction of the third portion. The fourth portion 414 forms the second engagement portion 402. With this configuration, the region where the lid portion and the opening edge portion overlap can be easily increased, and the lid portion can be engaged with the opening edge portion in a stable manner without increasing the dimension of the battery in the radial direction.

In FIG. 2E, a portion of the second surface S2 on the outer circumferential side does not overlap the first surface S1 and is exposed to the outside even when they are welded. On the other hand, in FIG. 2F, a portion of the first surface S1 on the outer circumferential side does not overlap the second surface S2 and is exposed to the outside even when they are welded.

In FIGS. 2A to 2F, the lid portion 330 may be bonded to the opening edge portion 110 of the cylinder portion 120 by welding. As the welding method, laser welding can be used. In the case where laser welding is performed, in FIGS. 2A to 2D, butt welding can be performed by applying a laser beam from an obliquely upward direction. Also, butt welding and overlap welding can be performed by applying a laser beam from an upward direction.

In FIG. 2E, for example, butt welding can be performed by applying a laser beam from the horizontal direction. In FIG. 2F, for example, butt welding and overlap welding can be performed by applying a laser beam from the horizontal direction.

In the examples shown in FIGS. 3A to 3H, the first surface S1 is the end face of the cylinder portion. However, in FIGS. 3B, 3C, 3F, and 3G the end face of the cylinder portion is inclined from a plane perpendicular to the extension direction (the axial direction) of the opening edge portion. Accordingly, the first surface S1 is inclined obliquely with respect to the axial direction and the radial direction. The second surface S2 is also inclined obliquely with respect to the axial direction and the radial direction so as to correspond to the first surface S1.

In the examples shown in FIG. 3A, FIGS. 3C to 3E, and FIGS. 3G and 3H, the second surface S2 is the surface (inner surface) of the lid portion on the bottom portion side. In the examples shown in FIGS. 3B and 3F, the second surface S2 is the end face of the lid portion, and the end face of the lid portion is inclined from a plane perpendicular to the extension direction (the radial direction) of the end portion of the lid portion on the outer circumferential side. Accordingly, the second surface S2 is inclined obliquely with respect to the axial direction and the radial direction.

In FIGS. 3A to 3D, the end portion of the lid portion 330 includes a third portion 413 that is bent and extends toward the opening edge portion side (in the upward direction of the battery) in the axial direction of the cylinder portion and a fourth portion 414 that is bent from the third portion 413 in a direction opposite to the bending direction of the third portion. The fourth portion 414 forms the second engagement portion 402. The third portion 413 extends along the inner circumferential surface of the cylinder portion 120, and the fourth portion 414 extends outward from the third portion 413 in the radial direction of the cylinder portion. In other words, in FIGS. 3A to 3D, the end portion of the lid portion 330 is formed into a crank.

Figure 3A:
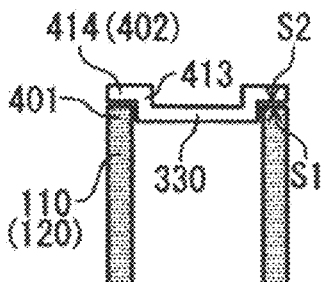
FIG. 3A is a schematic diagram showing still another example of the method for bonding the lid portion and the opening edge portion in the battery according to the embodiment of the present invention.
Figure 3B:
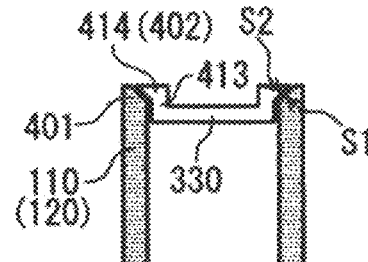
FIG. 3B is a schematic diagram showing still another example of the method for bonding the lid portion and the opening edge portion in the battery according to the embodiment of the present invention.
Figure 3C:
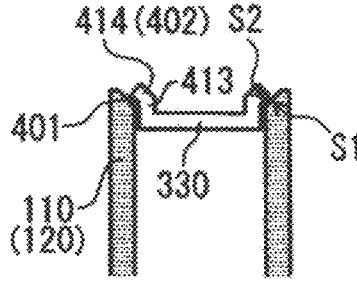
FIG. 3C is a schematic diagram showing still another example of the method for bonding the lid portion and the opening edge portion in the battery according to the embodiment of the present invention.
Figure 3D:
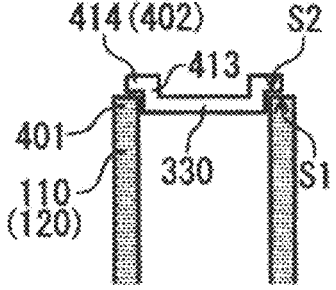
FIG. 3D is a schematic diagram showing still another example of the method for bonding the lid portion and the opening edge portion in the battery according to the embodiment of the present invention.
Figure 3E:
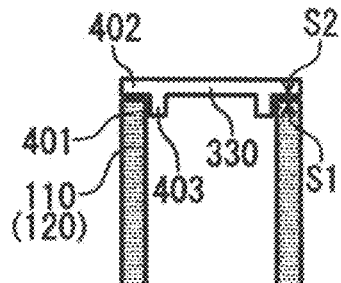
FIG. 3E is a schematic diagram showing still another example of the method for bonding the lid portion and the opening edge portion in the battery according to the embodiment of the present invention.
Figure 3F:
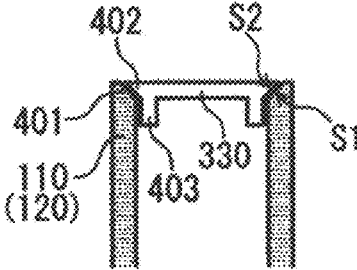
FIG. 3F is a schematic diagram showing still another example of the method for bonding the lid portion and the opening edge portion in the battery according to the embodiment of the present invention.
Figure 3G:
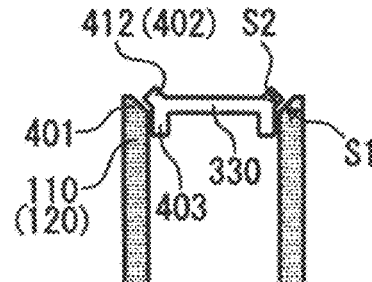
FIG. 3G is a schematic diagram showing still another example of the method for bonding the lid portion and the opening edge portion in the battery according to the embodiment of the present invention.
Figure 3H:
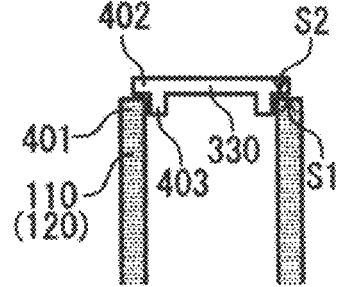
FIG. 3H is a schematic diagram showing still another example of the method for bonding the lid portion and the opening edge portion in the battery according to the embodiment of the present invention.

In FIGS. 3E to 3H, a rib 403 is provided on a surface of the lid portion 330 that opposes the electrode body (not shown). The rib 403 extends from the lid portion toward the electrode body along the inner circumferential surface of the cylinder portion of the lid portion 330. In FIG. 3G, the end portion of the lid portion includes a second portion 412 that is bent and extends toward the opening edge portion side (in the upward direction of the battery) in the axial direction of the cylinder portion. The second portion 412 forms the second engagement portion 402.

In FIGS. 3C, 3D, 3G and 3H, a portion of the first surface S1 on the outer circumferential side does not overlap the second surface S2 and is exposed to the outside even when they are welded.

In FIGS. 3A to 3H, the lid portion 330 may be bonded to the opening edge portion 110 of the cylinder portion 120 by welding. As the welding method, laser welding can be used. In the case where laser welding is performed, as shown in the examples shown in FIGS. 3A and 3E, overlap welding can be performed by applying a laser beam from an upward direction. In the examples shown in FIGS. 3B to 3D and FIGS. 3F to 3H, for example, both overlap welding and butt welding can be performed.

In FIGS. 3A to 3H, in the lid portion, an O ring made of an insulating material may be provided in a portion that opposes the inner circumferential surface of the cylinder portion (or in other words, the outer circumferential surface of the third portion 413 or the rib 403). By doing so, it is possible to prevent metal dust from entering the battery can, formed as a result of the lid portion being rubbed when the lid portion is inserted into the opening edge portion.

Also, in FIGS. 1 to 3, only the lid portion and the cylinder portion are illustrated in order to focus on the abutting state in which the lid portion and the opening edge portion abut against each other. However, the configurations of the sealing member such as a terminal portion and a gasket, as will be described hereinafter, are of course applicable to the configurations disclosed in FIGS. 1 to 3.

Figure 4:
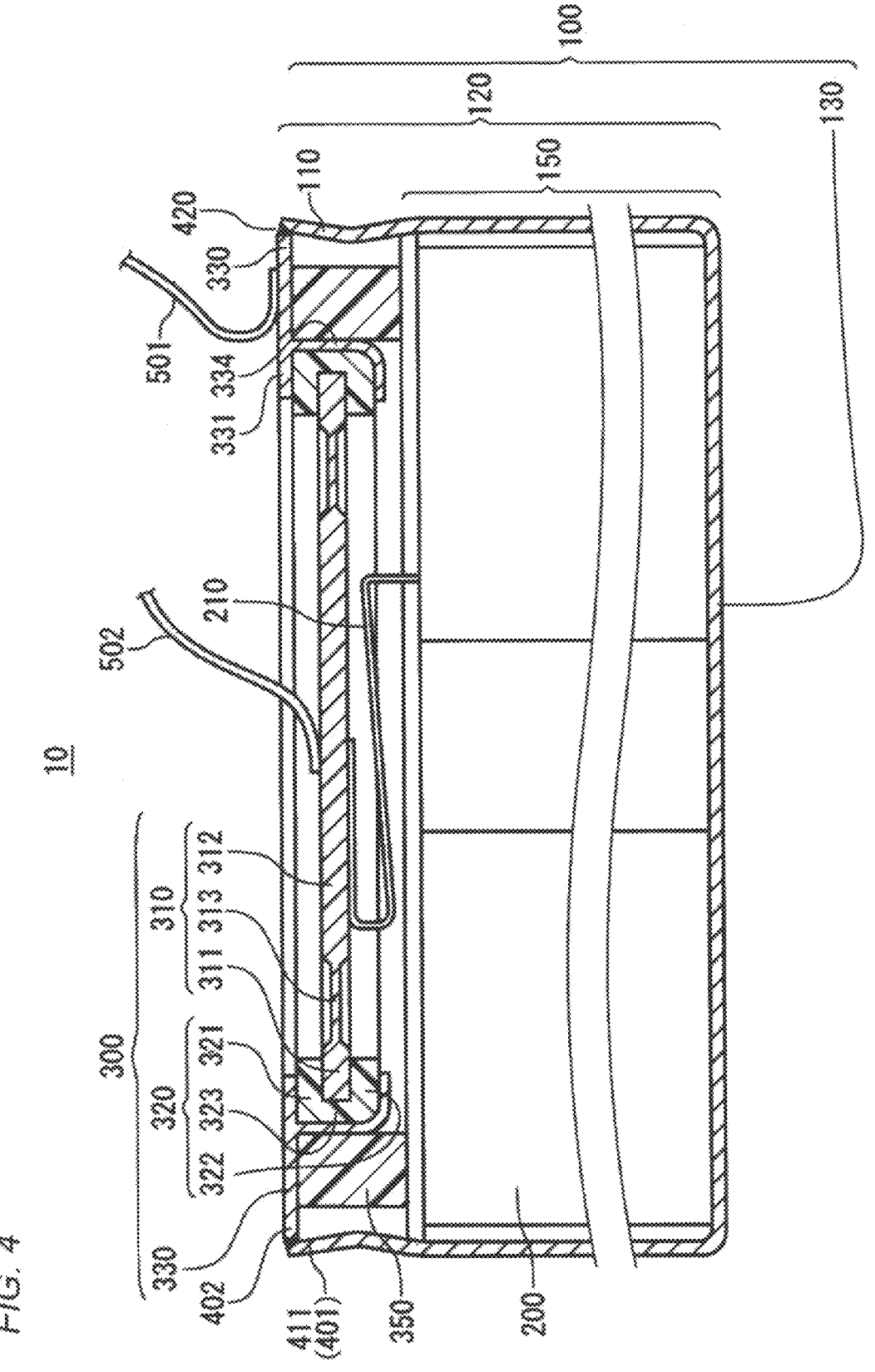
FIG. 4 is a schematic vertical cross sectional view of a battery according to a first embodiment of the present invention.

FIG. 4 is a schematic vertical cross-sectional view of a battery 10 according to the present embodiment. Note that FIG. 4 is illustrated to emphasize the cylinder portion of the battery, in particular, the vicinity of the opening edge portion 110. The dimensional ratio between elements of constituent members such as a terminal portion 310, a gasket 320, and a lid portion 330 does not necessarily match the actual dimensional ratio.

The battery 10 is a cylindrical battery, and includes a bottomed cylindrical battery can 100, a cylindrical electrode body 200 housed in the can, and a sealing member 300 that seals an opening of the battery can 100. The battery can 100 includes a cylinder portion 120 that houses the electrode body 200 and a bottom portion 130. The cylinder portion 120 includes an opening edge portion 110 at one of end portions of the cylinder portion 120, and the other end portion is closed by the bottom portion 130. The cylinder portion 120 includes the opening edge portion 110 and a housing portion 150 that houses the electrode body. The opening of the opening edge portion 110 is closed by the sealing member 300.

The sealing member 300 includes a terminal portion 310, a gasket 320, and a lid portion 330. The lid portion 330 is connected to the opening edge portion 110 of the battery can 100 via a bonding portion 420.

As shown in FIGS. 1 to 3 described above, the bonding portion 420 may be formed by bringing the end portion of the opening edge portion 110 and the end portion of the lid portion 330 together to overlap each other, and then performing, for example, laser welding to bond them together. In FIG. 4, the opening edge portion 110 and the end portion of the lid portion 330 on the outer circumferential side are configured similarly to those of FIG. 1C, and the inner circumferential surface (first surface) of the first portion 411 that is bent and extends inward in the radial direction and the end face (second surface) of the lid portion 330 are in surface contact with each other while being inclined obliquely with respect to the axial direction and the radial direction.

The terminal portion 310 may be, for example, disc-shaped and have an explosion prevention function. Specifically, the terminal portion 310 includes a circumferential edge portion 311 and a center region 312 that have a large thickness to ensure mechanical strength, and a thin portion 313 that exhibits the explosion prevention function. The thin portion 313 is provided in a region between the circumferential edge portion 311 and the center region 312. An end portion of a lead wire 210 is drawn out from the positive electrode or the negative electrode that constitutes the electrode body 200 to be connected to an inner surface of the center region 312. Accordingly, the terminal portion 310 functions as one of the terminals.

When the internal pressure of the battery can 100 increases, the terminal portion 310 bulges outward, and a stress caused by the tension concentrates, for example, on a boundary between the circumferential edge portion 311 and the thin portion 313, and a fracture occurs from the boundary. As a result, the internal pressure of the battery can 100 is released, and safety of the battery 10 is ensured. The explosion prevention function is not required to achieve the advantageous effects of the present invention.

The gasket 320 seals a space between the lid portion 330 and the terminal portion 310. The gasket 320 includes, for example, an outer ring portion 321 that covers an upper surface of the circumferential edge portion 311 of the terminal portion 310, an inner ring portion 322 that covers a lower surface of the circumferential edge portion 311 of the terminal portion 310, and a relay ring portion 323 that connects the outer ring portion and the inner ring portion. For example, the outer ring portion 321, the inner ring portion 322, and the relay ring portion 323 of the gasket 320 are formed as an integrally molded body.

The terminal portion 310 and the gasket 320 may be bonded to each other. For example, by integrally molding the terminal portion 310 and the gasket 320, a sealing body in which the terminal portion 310 and the gasket 320 are bonded to each other can be obtained. As the method for integrally molding the terminal portion and the gasket, insert molding can be used. In this case, the shape of the terminal portion 310 and the gasket 320 is not particularly limited, and can be designed into any shape. Also, as a result of the terminal portion 310 and the gasket 320 being integrally molded, the terminal portion 310 and the gasket 320 can be handled as one component, and thus the production of the battery can be facilitated.

The lid portion 330 includes, for example, a ring-shaped plate, and includes a through hole and a top plate portion 331 that surrounds the through hole. The through hole is closed by the terminal portion 310. The lid portion 330 is electrically insulated from the terminal portion 310 by the gasket 320.

The lid portion 330 is electrically conductive, and has the same polarity as that of the battery can 100. Accordingly, the lid portion 330 can function as the other terminal that has a different polarity from that of the terminal portion 310. For this reason, electric current from each of the two electrodes of the battery 10 can be collected from an upper surface of the sealing member 300. For example, a configuration is possible in which a first external lead wire 501 is connected to the top plate portion 331 of the lid portion 330, and a second external lead wire 502 is connected to an outer surface of the center region 312 of the terminal portion 310.

The lid portion 330 may further include a supporting portion 334. The supporting portion 334 is provided to stand from the inner surface (lower surface) of the lid portion, and extend toward the bottom portion 130 in the axial direction. The gasket 320 is fixed to the lid portion 330 by the supporting portion 334, with the space between the lid portion 330 and the terminal portion 310 being sealed. When the position from which the supporting portion 334 stands is viewed from the axial direction, the contour line of the supporting portion 334 may have, for example, a shape that conforms to an outer edge of the gasket 320. However, the contour line does not necessarily need to be a continuous closed curve, and may include a partial region where the supporting portion 334 is not provided in the circumferential direction. The contour line may be intermittent in the circumferential direction of the outer circumferential surface of the gasket 320.

The gasket 320 may have an outer diameter larger than an inner diameter of the supporting portion 334 in a no-load state. In this case, by press-fitting, a side wall portion of the gasket 320 comes into close contact with the supporting portion 334, and thus the space between the lid portion 330 and the terminal portion 310 can be sealed.

The supporting portion 334 extends toward the bottom portion 130 in the axial direction, and is bent along the inner ring portion 322 of the gasket 320 so as to extend inward toward the center region 312 of the terminal portion 310. With this configuration, sealing properties between the lid portion 330 and the terminal portion 310 can be further enhanced. The bent portion of the supporting portion 334 may be formed by crimping and bending a portion of the standing supporting portion 334 toward the inner circumferential side. The bent portion does not necessarily need to be formed around the entire circumference of the supporting portion 334, and may be formed intermittently along the circumferential direction.

A second gasket 350 may be provided on the outer circumferential side of the position from which the supporting portion 334 extends to stand. The second gasket 350 may be sandwiched between the lid portion 330 and an upper insulating plate that insulates the electrode body 200 from the opening edge portion 110 and the supporting portion 334. The second gasket 350 abuts against the electrode body 200 via the upper insulating plate (or directly), which prevents the electrode body 200 from being displaced in the battery can 100. With this configuration, it is possible to prevent a mechanical stress from being applied to the lead wires that are electrically connected to the electrode body 200, or prevent the electrode body 200 from colliding with the battery can 100 or the sealing member 300, and the electrodes and the separator included in the electrode body 200 from deforming.

Second Embodiment

The end portion of the cylinder portion on the opening edge portion side and the end portion of the lid portion on the outer circumferential side may be bonded via an alloy portion that contains iron and nickel. In this case, the nickel content in the alloy portion may be 1.4 mass % or more.

A battery according to the present embodiment includes: a battery can that includes a cylinder portion and a bottom portion, the cylinder portion having an opening edge portion at one of end portions of the cylinder portion, the other one of the end portions of the cylinder portion being closed by the bottom portion; an electrode body that is housed in the cylinder portion; and a sealing member that is fixed to the cylinder portion to seal an opening of the opening edge portion. The sealing member includes a lid portion that covers the opening of the opening edge portion.

The end portion of the cylinder portion on the opening edge portion side and the end portion of the lid portion on the outer circumferential side are bonded by the alloy portion. They can be bonded by, for example, welding. By performing welding, the battery can is hermetically sealed, and the lid portion can be firmly fixed to the battery can. The lid portion is electrically connected to the cylinder portion of the battery can via the alloy portion. Accordingly, the lid portion may be electrically connected to the other electrode of the electrode body.

However, when the space between the opening edge portion of the cylinder portion and the lid portion are sealed by forming the alloy portion by welding, rust may be formed in the alloy portion, which results in reduction of the sealing properties and the sealing pressure resistance and causes the occurrence of leakage of electrolyte or gas in a normal battery usage environment. For this reason, preventing the formation of rust in the alloy portion has been required to achieve a battery with a high energy density.

In order to solve this problem, in the battery of the present embodiment, the alloy portion contains iron (Fe) and nickel (Ni). An alloy that contains iron and nickel has anti-corrosion properties. Particularly when the Ni content in the alloy portion is 1.4 mass % or more, high anti-corrosion properties required to prevent the reduction in the sealing pressure resistance can be obtained, and a battery with a high energy density can be achieved. More preferably, the Ni content in the alloy portion may be 3 mass % or more. In this case, the reduction in the sealing pressure resistance is further prevented.

The battery can (cylinder portion) and the lid portion can be made using, for example, an iron (Fe)-containing material such as a steel plate or a stainless steel plate. The battery can (cylinder portion) and the lid portion may contain, in addition to iron (Fe), an element other than iron. Examples of the element other than iron include carbon (C), Cr, Mn, Ni, Co, Al, and the like. The battery can (cylinder portion) and/or the lid portion may be made using an alloy that contains iron and an element other than iron. The iron content in the battery can (cylinder portion) and/or the lid portion may be 50 mass % or more.

In the case where the alloy portion is formed by welding, the alloy portion may contain both an element that is contained in the opening edge portion of the cylinder portion of the battery can and an element that is contained in the end portion of the lid portion on the outer circumferential side. In the case where the opening edge portion and/or the lid portion contains iron (Fe), when either one of the opening edge portion and/or the lid portion contains nickel (Ni), an alloy portion that contains iron and nickel can be formed.

By nickel plating, a battery can that includes a nickel layer formed on a surface of the battery can may be used. By doing so, the anti-corrosion performance can be enhanced. However, a nickel-plated battery can is usually produced by cutting a steel plate that has been plated with nickel in advance, processing the steel plate into a cylindrical shape, and then trimming the cylinder portion on the opening side. In this case, an underlying metal that is not plated with nickel is exposed at the end face of the opening edge portion of the battery can. In this state, even when an alloy portion is formed by welding the opening edge portion and the end portion of the lid portion, the underlying metal such as iron is exposed at the end face of the opening edge portion, and there is almost no Ni, and it is therefore difficult to increase the Ni content in the alloy portion to 1.4 mass % or more.

The Ni content in the alloy portion can be increased to 1.4 mass % or more by again plating with nickel the end face of the opening edge portion of the produced battery can before welding. However, the formed battery can has a complex shape as compared with a plain steel plate, and thus an increased number of production steps are required to perform plating while suppressing non-uniformity of the plating. In addition, the battery can is more likely to increase in volume than the sealing member, and thus the production equipment tends to be large. As a result, the production cost is likely to be high.

To address this, in the present embodiment, as an example of the method for increasing the Ni content in the alloy portion, a nickel layer is formed at least on the end portion of the lid portion on the outer circumferential side by, for example, plating, and the nickel layer is formed to be thick. By doing so, due to the high temperature during welding, the Ni in the nickel layer formed on the end portion of the lid portion on the outer circumferential side diffuses into the opening edge portion side to form an alloy portion that contains Fe and Ni. The Ni content in the alloy portion is controlled by the thickness of the nickel layer formed on the end portion of the lid portion on the outer circumferential side, and thus can be easily increased to 1.4 mass % or more. In the case where the end portion of the lid portion is welded such that the end portion of the lid portion opposes and abuts against the inner circumferential surface of the opening edge portion, welding may be performed such that, in an upper surface (a surface that is distant from the bottom portion of the battery can) of the lid portion, the nickel layer on the outer circumferential portion is formed to be thicker than that on the inner circumferential side.

The welding method is not particularly limited, and can be selected as appropriate according to the material of the lid portion and the battery can. Examples of the welding method include laser welding, resistance welding, friction stir welding, and the like.

The alloy portion may cover the entire end face of the opening edge portion. In this case, the end face of the opening edge portion before welding disappears as a result of the alloy portion being formed, and a new end face of the opening edge portion that is not exposed to the outside is formed at a boundary between the alloy portion and the cylinder portion. Likewise, the alloy portion may cover the entire end face of the lid portion on the outer circumferential side. In this case, the end face of the lid portion on the outer circumferential side before welding disappears as a result of the alloy portion being formed, and a new end face that is not exposed to the outside is formed at a boundary between the alloy portion and the lid portion.

Hereinafter, the nickel layer that covers the end face of the lid portion on the outer circumferential side will be referred to as "first nickel layer". In the case where the first nickel layer is formed on the end face of the lid portion on the outer circumferential side before welding, after welding has been performed, a portion of the end face of the lid portion on the outer circumferential side may be covered with the alloy portion and the remaining portion of the end face of the lid portion on the outer circumferential side may be covered with the first nickel layer.

A main surface of the lid portion that constitutes the outer surface of the lid portion may be plated with nickel, to form a nickel layer that covers the main surface. Hereinafter, the nickel layer that covers the main surface that constitutes the outer surface of the lid portion will be referred to as "second nickel layer". At least a portion of the first nickel layer is turned into the alloy portion through the welding step. In the case where the first nickel layer remains on the end face of the lid portion on the outer circumferential side after welding, the first nickel layer may be thicker than the second nickel layer.

In the case where the first nickel layer is formed on the end face of the lid portion on the outer circumferential side, and the second nickel layer is formed on the main surface of the lid portion, the second nickel layer may be formed in a first region and a second region, the first region being located adjacent to the alloy portion, and the second region being located adjacent to the first region and opposite to the alloy portion. The second nickel layer formed in the first region may be the first nickel layer that remains after the alloy portion has been formed. In this case, the second nickel layer may be thicker in the first region than in the second region, when viewed from the main surface side.

Also, the Ni contained in the alloy portion is supplied from the first nickel layer. The alloy portion is formed as a result of the Ni contained in the first nickel layer diffusing into the end portion of the opening edge portion, and thus the alloy portion may have a Ni concentration distribution in which the Ni concentration is higher on the lid portion side than on the opening edge portion side.

The end portion of the lid portion on the outer circumferential side may be bent outward (upward direction) in the axial direction of the cylinder portion, and the alloy portion may be formed at a leading end of a protruding wall that is bent and extends outward (upward direction). By arranging the bonding surface to face upward, laser welding can be easily performed. Also, by arranging the welding portion at a position away from the electrode body, it is possible to suppress degradation of the electrode body and/or the electrolytic solution caused as a result of heat applied to the welding portion during welding being transferred to the electrode body and/or the electrolytic solution.

The battery according to the present embodiment can be produced by: for example, in the step (i) of preparing the battery can, preparing the battery can in which a nickel layer is formed on a side circumferential surface of a cylinder portion and a surface of a bottom portion, and a nickel layer is not formed on an end face of an opening edge portion; and, in the step (ii), preparing a sealing member in which a nickel layer is formed at least on an end face of a metal lid portion on an outer circumferential side. The nickel layer may be formed by, for example, plating. The thickness of the nickel layer is 3 μm or more. The thickness of the nickel layer is preferably 7 μm or more.

Then, in the welding step the end portion of the lid portion on which the nickel layer has been formed and the end portion of the opening edge portion that does not contain nickel are melted. As a result, an alloy portion that contains nickel is formed at least on the end face of the opening edge portion, and the lid portion and the opening edge portion are bonded to each other.

The cylinder portion may contain iron or an alloy thereof. In this case, in the step (i) of preparing the battery can, an iron layer or an iron alloy layer may be exposed at the end face of the opening edge portion. However, the entire end face of the opening edge portion can be covered with the alloy portion that contains nickel, as a result of preparing in the step (ii) the sealing member in which a nickel layer is formed on the end face of the lid portion on the outer circumferential side, and forming in the step (iii) the alloy portion by welding the end portion of the cylinder portion and the end portion of the lid portion. By controlling the thickness of the nickel layer such that the Ni content in the alloy portion is 1.4 mass % or more, a battery with excellent anti-corrosion properties and a high energy density is produced.

As the plating method for forming the nickel layer, a known method can be used. As the plating method, for example, electro-plating, electroless plating, sputtering, or the like can be used.

Figure 5:
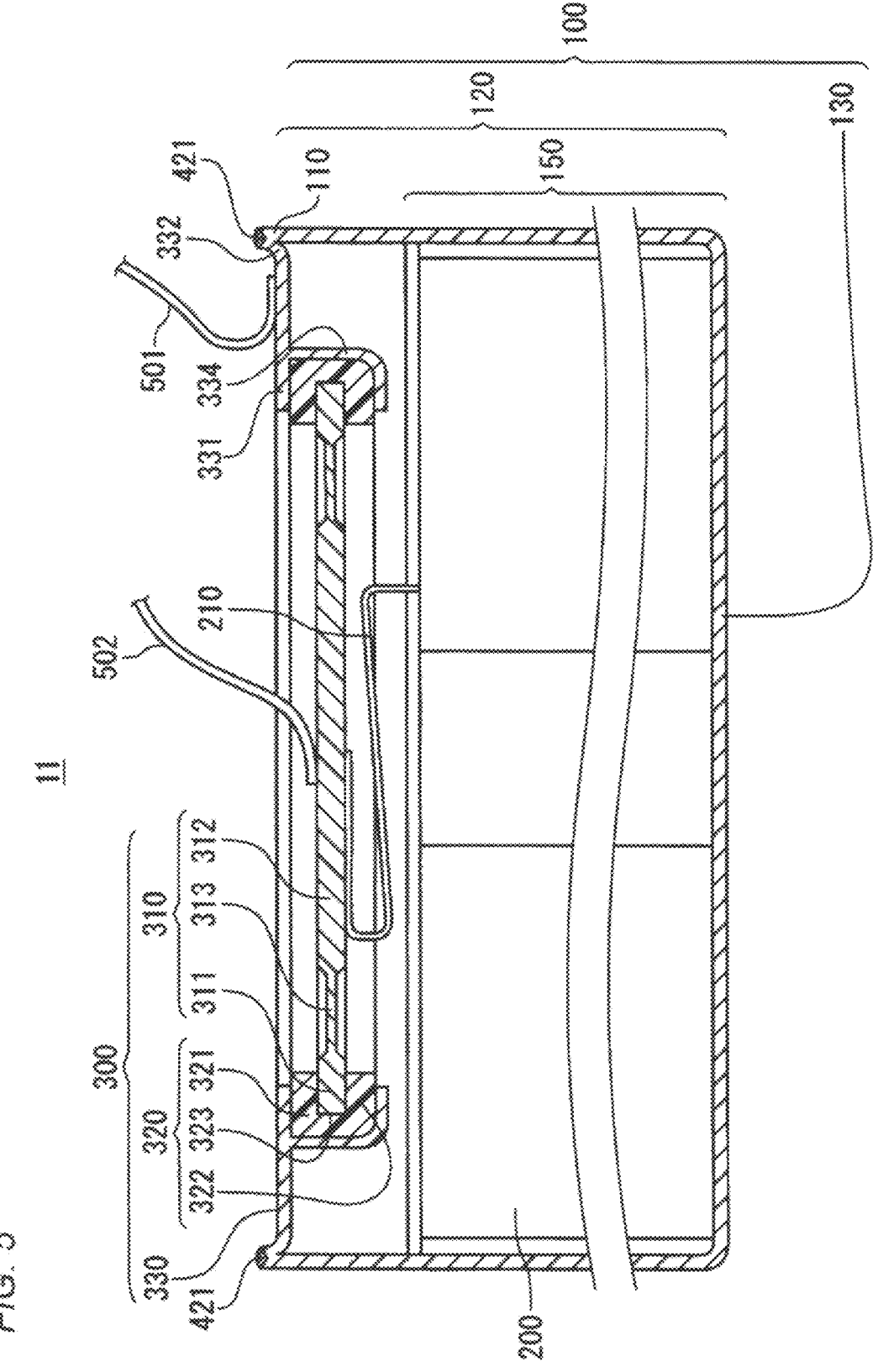
FIG. 5 is a schematic vertical cross sectional view of a battery according to a second embodiment of the present invention.
Figure 6:
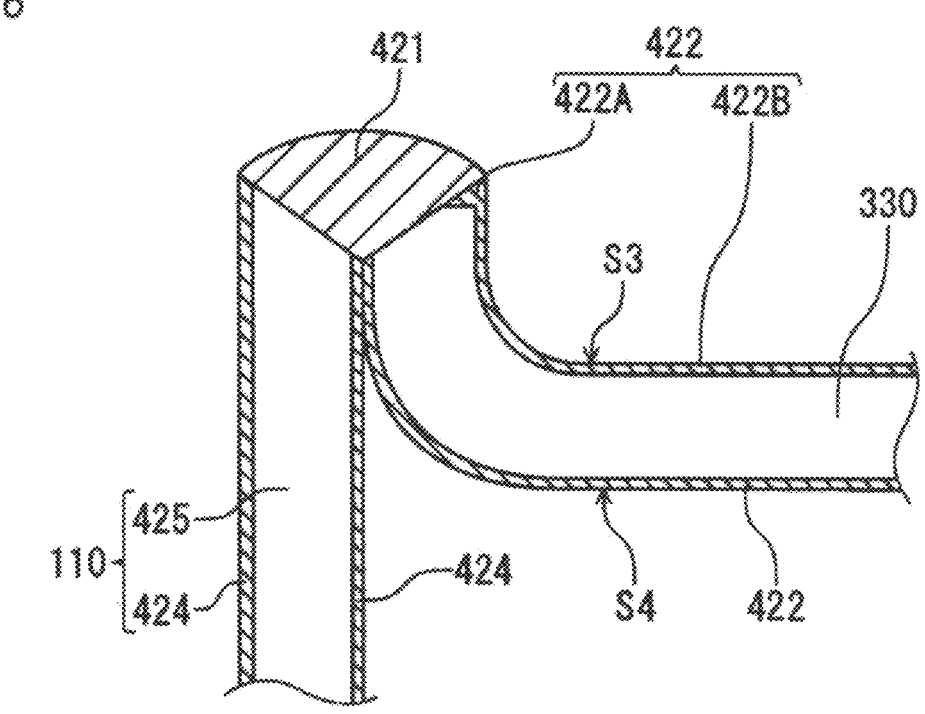
FIG. 6 is an enlarged schematic vertical cross sectional view of a bonded portion between a lid portion and an opening edge portion in the battery according to the second embodiment of the present invention.
Figure 7:
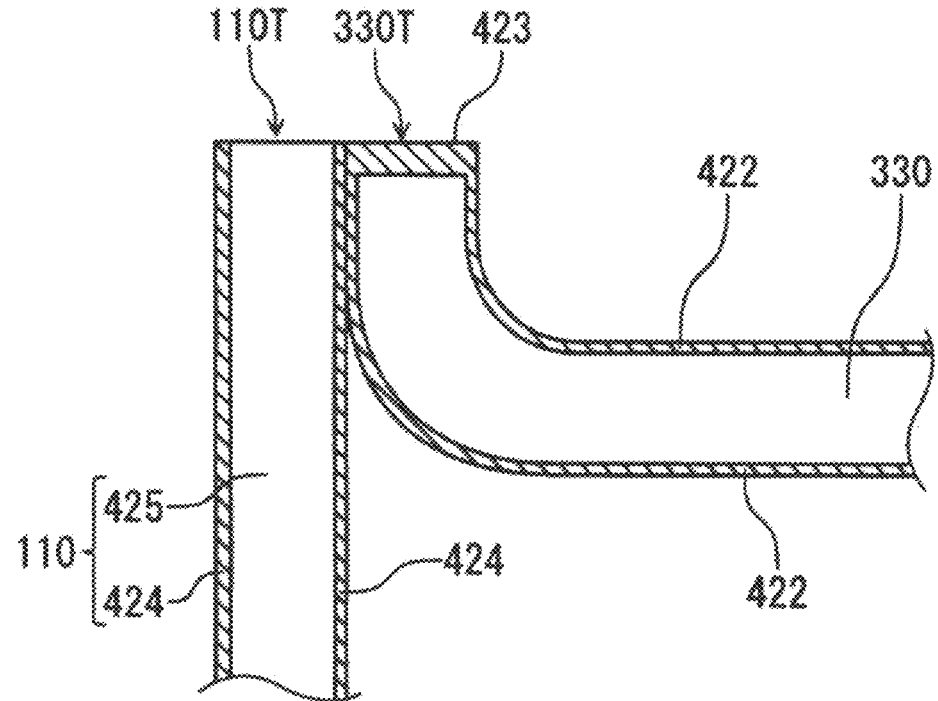
FIG. 7 is a schematic vertical cross sectional view showing the lid portion and the opening edge portion in the battery according to the second embodiment of the present invention before the lid portion and the opening edge portion are bonded to each other.

FIG. 5 is a schematic vertical cross sectional view of a battery 11 according to the present embodiment that includes a nickel-containing alloy portion. FIG. 6 is an enlarged schematic cross sectional view of a bonding portion between the lid portion and the opening edge portion in the battery 11. FIG. 7 is a schematic diagram showing the lid portion and the opening edge portion before they are bonded to each other. Note that FIG. 5 is illustrated to emphasize the cylinder portion of the battery, in particular, the vicinity of the opening edge portion 110. The dimensional ratio between elements of the constituent members such as the terminal portion 310, the gasket 320, and the lid portion 330 does not necessarily match the actual dimensional ratio.

As with the battery 10, the battery 11 is a cylindrical battery, and includes a bottomed cylindrical battery can 100, a cylindrical electrode body 200 housed in the battery can 100, and a sealing member 300 that seals an opening of the battery can 100. The battery can 100 includes a cylinder portion 120 that houses the electrode body 200 and a bottom portion 130. The cylinder portion 120 includes an opening edge portion 110 at one of end portions of the cylinder portion 120, and the other end portion is closed by the bottom portion 130. The cylinder portion 120 includes the opening edge portion 110 and a housing portion 150 that houses the electrode body. The opening of the opening edge portion 110 is closed by the sealing member 300.

The sealing member 300 includes a terminal portion 310, a gasket 320, and a lid portion 330. The lid portion 330 is connected to the opening edge portion 110 of the battery can 100 via an alloy portion 421.

The alloy portion 421 shown in FIG. 6 can be formed by bringing the end portion of the opening edge portion 110 and the end portion of the lid portion 330 together to overlap each other, as shown in FIG. 7 and performing, for example, laser welding. In FIG. 6, an outer surface S3 and an inner surface S4 of the lid portion 330 are both covered with a nickel layer (second nickel layer) 422.

As shown in FIG. 7, in a state before welding, an inner surface and an outer surface of the battery can 100 are covered with a nickel layer 424 as a result of the inner surface and the outer surface of the battery can being plated with nickel. However, an end face 110T of the opening edge portion 110 is not covered with a nickel layer 424, and thus an underlying metal layer 425 containing iron is exposed. On the other hand, an end face 330T of the lid portion 330 on the outer circumferential side is covered with a nickel layer (first nickel layer) 423 as a result of the end face 330T on the outer circumferential side being plated with nickel.

When the alloy portion 421 is formed by welding, at least a portion of the end face 110T of the opening edge portion 110 and at least a portion of the end face 330T of the lid portion 330 disappear. At this time, an interface between the alloy portion 421 and the cylinder portion 120 forms a new end face of the opening edge portion 110, and an interface between the alloy portion 421 and the lid portion 330 forms a new end face of the lid portion 330. In the example shown in FIG. 6, the alloy portion 421 is formed so as to cover the entire end face of the opening edge portion 110 and the entire end face of the lid portion 330 on the outer circumferential side. In this case, the entire end face 110T of the opening edge portion 110 before welding shown in FIG. 7 and the entire end face 330T of the lid portion 330 before welding shown in FIG. 7 disappear, and an end face of the opening edge portion 110 and an end face of the lid portion 330 that are not exposed to the outside are formed.

The alloy portion 421 may be formed by melting a contact region between the end portion of the opening edge portion 110 and the end portion of the lid portion 330 on the outer circumferential side by performing, for example, laser welding. At this time, the Ni contained in the nickel layer 423 of the lid portion diffuses into the opening edge portion 110, and an alloy portion 421 that contains Fe and Ni is formed. The Ni content in the alloy portion 421 is 1.4 mass % or more. However, because Ni diffuses into the opening edge portion 110 from the nickel layer 423 of the lid portion, the alloy portion 421 may have a Ni concentration distribution in which the Ni concentration is higher on the lid portion side than on the opening edge portion side (cylinder portion side).

In FIG. 7, the nickel layer 423 that covers the end face of the lid portion may have a thickness of 3 μm or more, or 7 μm or more so as to form the alloy portion 421 with a Ni content of 1.4 mass % or more.

In FIG. 6, the nickel layer 422 that covers the outer surface S3 of the lid portion 330 includes a nickel layer 422A that is formed in a region (first region) that is adjacent to the alloy portion 421 and a nickel layer 422B that is formed in a region (second region) that is adjacent to the first region and opposite to the alloy portion 421. The nickel layer 422A is a remaining portion of the nickel layer 423 shown in FIG. 7 after welding. In the case where the alloy portion 421 is formed so as to have a cross section with, for example, as shown in FIG. 6, a shape that includes an arc (for example, a fan shape) from the contact region between the opening edge portion 110 and the lid portion 330, the nickel layer 423 may remain in the lid portion on the inner circumferential side rather than the alloy portion 421. In this case, the nickel layer 422A that is the remaining portion of the nickel layer 423 is thicker than the nickel layer 422B, when viewed from the outer surface S3 of the lid portion.

A dimension (maximum length) of the alloy portion 421 in the axial direction (up-down direction) of the battery can 100 is preferably smaller than a dimension (maximum length) of the alloy portion 421 in the radial direction (the thickness direction of the cylinder portion) of the battery can. With this configuration, the proportion of the nickel layer 423 in the melted portion can be easily increased. Accordingly, the nickel concentration in the alloy portion 421 can be easily increased.

The alloy portion 421 does not necessarily need to be formed on the entire end face 330T of the lid portion 330 on the outer circumferential side, and a portion of the end face 330T may be covered with the nickel layer 423.

The end portion of the lid portion on the outer circumferential side is bent outward (upward direction) in the axial direction of the cylinder portion, and a protruding wall 332 that protrudes outward (upward direction) is thereby formed. The alloy portion 421 is formed at a leading end of the protruding wall 332.

Other structural elements of the battery 11 are the same as those of the battery 10 of the first embodiment.

In the present embodiment, the nickel layer 423 that covers the end face of the lid portion 330 is formed to be thicker than the nickel layer 422 that covers the outer surface and the inner surface of the lid portion 330. However, the present invention is not limited thereto. For example, in the case where the present embodiment is applied to the configuration of the opening edge portion 110 and the lid portion 330 shown in FIG. 2E, the nickel layer that covers the inner surface of the second portion 412 of the lid portion 330 may be formed to be thicker than the nickel layer that covers the end face of the lid portion 330.

The method of the present embodiment is also applicable to the battery according to the first embodiment. For example, in the case of the configurations of the opening edge portion 110 and the lid portion 330 shown in FIGS. 1 to 3, the nickel layer that covers the second surface S2 of the lid portion may be formed to be thicker than the other portion. That is, in the second engagement portion 402 of the lid portion 330, the nickel layer formed on the interface that abuts against the opening edge portion 110 and the vicinity thereof may be formed to be thicker than the other portion. Also, the nickel layer formed on a weld forming surface of the second engagement portion 402 of the lid portion 330 and the vicinity thereof may be formed to be thicker than the other portion.

The material of the battery can 100 is not particularly limited. Examples of the material of the battery can 100 include iron and/or an iron alloy (including stainless steel), copper, aluminum, an aluminum alloy (an alloy that contains a tiny amount of other metals such as manganese and copper, etc.), and the like. The material of the lid portion 330 is not particularly limited either, and the same materials as those listed for the battery can 100 can be used.

The material of the gaskets 320 and 350 is not particularly limited. For example, materials that can be easily integrally molded such as polypropylene (PP), polyphenylene sulfide (PPS), polyethylene (PE), polybutylene terephthalate (PBT), perfluoroalkoxy alkane (PFA), polytetrafluoroethylene (PTFE), and polyamide (PA) can be used.

Next, an exemplary description of the configuration of the electrode body 200 will be given by taking a lithium ion secondary battery as an example.

The cylindrical electrode body 200 is a wound electrode body configured by spirally winding a positive electrode and a negative electrode with a separator interposed therebetween. An inner lead wire 210 is connected to one of the positive electrode and the negative electrode. The inner lead wire 210 is connected to the inner surface of the center region 312 of the sealing plate 310 by welding or the like. Another lead wire is connected to the other one of the positive electrode and the negative electrode, and the other lead wire is connected to the inner surface of the battery can 100 by welding or the like. Also, another insulating plate (lower insulating plate) may be provided between the electrode body 200 and the bottom portion 130 of the battery can 100. In this case, the other lead wire may extend while bypassing the other insulating plate, or may be passed through a through hole formed in the other insulating plate.

Negative Electrode

The negative electrode includes a strip-shaped negative electrode current collector and a negative electrode active material layer formed on each surface of the negative electrode current collector. As the negative electrode current collector, a metal film, a metal foil, or the like is used. The material of the negative electrode current collector is preferably at least one selected from the group consisting of copper, nickel, titanium, alloys thereof, and stainless steel. The thickness of the negative electrode current collector is preferably, for example, 5 to 30 μm.

The negative electrode active material layer contains a negative electrode active material, and optionally a binding agent and a conductive material. The negative electrode active material layer may be a deposition film formed by a vapor phase method (for example, vapor deposition). Examples of the negative electrode active material include Li metal, metals or alloys that electrochemically react with Li, carbon material (for example, graphite), silicon alloys, silicon oxides, metal oxides (for example, lithium titanate), and the like. The thickness of the negative electrode active material layer is preferably, for example, 1 to 300 μm.

Positive Electrode

The positive electrode includes a strip-shaped positive electrode current collector and a positive electrode active material layer formed on each surface of the positive electrode current collector. As the positive electrode current collector, a metal film, a metal foil (a stainless steel foil, an aluminum foil, or an aluminum alloy foil), or the like is used.

The positive electrode active material layer contains a positive electrode active material and a binding agent, and optionally a conductive material. The positive electrode active material is not particularly limited, but a lithium-containing composite oxide such as $LiCoO_2$ or $LiNiO_2$ can be used. The thickness of the positive electrode active material layer is preferably, for example, 1 to 300 μm.

As the conductive material contained in each active material layer, graphite, carbon black, or the like is used. The amount of the conductive material is, for example, 0 to 20 parts by mass per 100 parts by mass of the active material. As the binding agent contained in the active material layer, fluorocarbon resin, acrylic resin, rubber particles, or the like may be used. The amount of the binding agent is, for example, 0.5 to 15 parts by mass per 100 parts by mass of the active material.

Separator

As the separator, a microporous film or a non-woven fabric made of resin is preferably used. Preferred examples of the material (resin) of the separator include polyolefin, polyamide, polyamide imide, and the like. The thickness of the separator may be, for example, 8 to 30 μm.

Electrolyte

As the electrolyte, a non-aqueous solvent in which a lithium salt is dissolved may be used. Examples of the lithium salt include $LiClO_4$, $LiBF_4$, $LiPF_6$, $LiCF_3SO_3$, $LiCF_3CO_2$, imide salts, and the like. Examples of the non-aqueous solvent include: cyclic carbonic esters such as propylene carbonate, ethylene carbonate, and butylene carbonate; linear carbonic esters such as diethyl carbonate, ethyl methyl carbonate, and dimethyl carbonate; cyclic carboxylic acid esters such as γ-butyrolactone and γ-valerolactone; and the like.

The foregoing description has been given by taking a lithium ion secondary battery as an example. However, the present invention is applicable to a battery in which the battery can is sealed by using a sealing body, irrespective of whether the battery is a primary battery or a secondary battery.

INDUSTRIAL APPLICABILITY

The battery according to the present invention is applicable to various can-type batteries, and is suitable for use as a power source for, for example, a portable device, a hybrid vehicle, an electric vehicle, or the like.

The present invention has been described in terms of the presently preferred embodiments, but the disclosure should not be interpreted as limiting. Various alterations and modifications will no doubt become apparent to those skilled in the art to which the invention pertains, after having read the disclosure. Accordingly, it is to be understood that the appended claims be interpreted as covering all variations and modifications which fall within the true spirit and scope of the present invention.

REFERENCE SIGNS LIST 10, 11: battery
100: battery can
  120: cylinder portion
    110: opening edge portion
      110T: end face 150: housing portion
130: bottom portion
200: electrode body
  210: inner lead wire
300: sealing member
  310: terminal portion
    311: circumferential edge portion
    312: center region
    313: thin portion
  320: gasket
    321: outer ring portion
    322: inner ring portion
    323: relay ring portion
  330: lid portion
    330T: end face
    331: top plate portion
    332: protruding wall
    334: supporting portion
  350: second gasket
401: first engagement portion
402: second engagement portion
411: first portion
412: second portion
413: third portion
414: fourth portion
415: fifth portion
420: bonding portion
421: alloy portion
422, 422A, 422B: nickel layer (second nickel layer)
423: nickel layer (first nickel layer)
424: nickel layer formed on surface of opening edge portion
425: underlying metal layer
501: first external lead wire
502: second external lead wire

The invention claimed is:

1. A battery comprising:
a battery can that includes a cylinder portion and a bottom portion, the cylinder portion having an opening edge portion at one of end portions of the cylinder portion, the other one of the end portions of the cylinder portion being closed by the bottom portion;
an electrode body that is housed in the cylinder portion; and
a sealing member that is fixed to the cylinder portion to seal an opening of the opening edge portion,
wherein the sealing member includes a lid portion that covers the opening,
a first engagement portion is formed in the end portion of the cylinder portion on an opening edge portion side,
a second engagement portion is formed in an end portion of the lid portion on an outer circumferential side,
a first surface of the first engagement portion and a second surface of the second engagement portion are bonded to each other, with the first surface and the second surface overlapping each other,
the opening edge portion includes a first portion that is bent and extends outward of the cylinder portion in a radial direction that is perpendicular to an axial direction of the cylinder portion, and the first portion forms the first engagement portion,
the first surface and the second surface are inclined obliquely with respect to the radial direction and the axial direction,
the end portion of the cylinder portion on the opening edge portion side and the end portion of the lid portion on the outer circumferential side are bonded via an alloy portion, and the alloy portion contains iron and nickel, with a nickel content in the alloy portion of 1.4 mass % or more, an entirety of the end face of the lid portion on the outer circumferential side is covered with the alloy portion, or a portion of the end face of the lid portion on the outer circumferential side is covered with the alloy portion and a remaining portion of the end face of the lid portion on the outer circumferential side is covered with a first nickel layer, and a portion of the end face of the lid portion on the outer circumferential side is covered with the first nickel layer, a main surface of the lid portion that constitutes an outer surface of the lid portion is covered with a second nickel layer, and the first nickel layer is thicker than the second nickel layer.

2. A battery comprising:

a battery can that includes a cylinder portion and a bottom portion, the cylinder portion having an opening edge portion at one of end portions of the cylinder portion, the other one of the end portions of the cylinder portion being closed by the bottom portion;

an electrode body that is housed in the cylinder portion; and a sealing member that is fixed to the cylinder portion to seal an opening of the opening edge portion, wherein the sealing member includes a lid portion that covers the opening, a first engagement portion is formed in the end portion of the cylinder portion on an opening edge portion side, a second engagement portion is formed in an end portion of the lid portion on an outer circumferential side, a first surface of the first engagement portion and a second surface of the second engagement portion are bonded to each other, with the first surface and the second surface overlapping each other, the opening edge portion includes a first portion that is bent and extends outward of the cylinder portion in a radial direction that is perpendicular to an axial direction of the cylinder portion, and the first portion forms the first engagement portion, the first surface and the second surface are inclined obliquely with respect to the radial direction and the axial direction, the end portion of the cylinder portion on the opening edge portion side and the end portion of the lid portion on the outer circumferential side are bonded via an alloy portion, and the alloy portion contains iron and nickel, with a nickel content in the alloy portion of 1.4 mass % or more, a main surface of the lid portion that constitutes an outer surface of the lid portion is covered with a second nickel layer, and the second nickel layer is formed in a first region and a second region, the first region being located adjacent to the alloy portion, and the second region being located adjacent to the first region and opposite to the alloy portion, and the second nickel layer formed in the first region is thicker than the second nickel layer formed in the second region.

3. The battery in accordance with claim 1, wherein either one of the first surface and the second surface includes a region that does not overlap the other one of the first surface and the second surface and is exposed to outside.

4. The battery in accordance with claim 2, wherein either one of the first surface and the second surface includes a region that does not overlap the other one of the first surface and the second surface and is exposed to outside.

* * * * *